United States Patent

Wein

[11] Patent Number: 5,941,603
[45] Date of Patent: Aug. 24, 1999

[54] VEHICLE SEAT ARMREST

[75] Inventor: Dietmar Wein, Burglengenfeld, Germany

[73] Assignee: Grammer AG, Amberg, Germany

[21] Appl. No.: 09/001,851

[22] Filed: Dec. 31, 1997

[30] Foreign Application Priority Data

Jan. 16, 1997 [DE] Germany ............................ 197 01 338

[51] Int. Cl.⁶ ................................ A47C 7/54; B60N 2/46
[52] U.S. Cl. ............................... 297/411.35; 297/411.32; 297/411.38
[58] Field of Search .......................... 297/411.35, 411.3, 297/411.32, 411.38

[56] References Cited

U.S. PATENT DOCUMENTS

| | | | |
|---|---|---|---|
| 4,097,088 | 6/1978 | Meiller | 297/411.35 X |
| 4,270,798 | 6/1981 | Harder, Jr. | 297/411.35 X |
| 4,435,011 | 3/1984 | Hakamata | 297/411.32 X |
| 4,496,190 | 1/1985 | Barley | 297/411.32 X |
| 4,621,864 | 11/1986 | Hill | 297/411.38 X |
| 4,828,323 | 5/1989 | Brodersen et al. | 297/411.38 X |
| 4,848,840 | 7/1989 | Toya | 297/411.32 |
| 4,881,424 | 11/1989 | Clark et al. | 297/411.38 X |
| 5,433,509 | 7/1995 | Hotary et al. | 297/411.38 X |
| 5,476,307 | 12/1995 | Whalen | 297/411.32 X |

FOREIGN PATENT DOCUMENTS

| | | |
|---|---|---|
| 10867 | 10/1982 | European Pat. Off. . |
| 1948855 | 7/1966 | Germany . |

*Primary Examiner*—Peter M. Cuomo
*Assistant Examiner*—Rodney B. White
*Attorney, Agent, or Firm*—Elliot M. Olstein; Raymond J. Lillie

[57] ABSTRACT

In an armrest arrangement for a vehicle seat the armrest member, for adjustment in respect of height and for simultaneous adjustment in the longitudinal direction of the seat, is connected to a pivot comprising first and second pivot levers which are at least approximately parallel to each other. The end portions of the first and second pivot levers, which are towards the armrest member, are connected together by a first element by associated first and second connecting shafts. The armrest is connected by a second element to the end portion of the second pivot lever, which is towards the armrest member. The first and second elements are detachably fixed together by an arresting member.

5 Claims, 1 Drawing Sheet

VEHICLE SEAT ARMREST

FIELD OF THE INVENTION

The invention concerns an armrest for a vehicle seat.

BACKGROUND OF THE INVENTION

One form of armrest for a vehicle seat, which affords adjustment in respect of height and simultaneous parallel adjustment in the longitudinal direction of the seat, as is to be found in EP 0 010 867 B1, comprises a hinge or pivoting assembly having a first and a second pivot lever which are disposed at least in approximately parallel relationship with each other. The end portions of the first and second pivot levers, which are towards the armrest member of the armrest assembly, are connected together by means of a connecting element, by way of respective associated first and second connecting axes. The armrest member is connected to the end portion of the second pivot lever, which is towards the armrest member, while the connecting element and the armrest member are releasably fixed together by means of an arresting arrangement.

Another form of armrest for a vehicle seat, including a pivot means such as to make the armrest member capable of adjustment in respect of height and at the same time capable of parallel adjustment in the longitudinal direction of the seat is also to be found in U.S. Pat. No. 4,496,190. The pivoting means is formed by first and second pivot levers which are disposed in mutually parallel relationship, while the assembly further includes an arresting means such that the armrest member can be fixed in any desired position.

DE 1 948 855 U1 further discloses an armrest assembly for a vehicle seat, with the armrest assembly being pivotable upwardly and adjustable in respect of height about a horizontal axis.

SUMMARY OF THE INVENTION

An object of the present invention is to provide an armrest for a vehicle seat which, while being of a simple design structure, can be reliably fixed in any desired adjusted position in respect of height and associated adjusted position in the longitudinal direction of the seat.

Another object of the present invention is to provide an adjustable armrest assembly for a vehicle seat, which, while being of a simple structure, is adjustable virtually continuously into a plurality of desired positions and which can be reliably fixed in a respective set position.

In accordance with the principles of the present invention the foregoing and other objects are attained by an armrest for a vehicle seat, comprising an armrest member which, for adjustment in respect of height and for simultaneous parallel adjustment in the longitudinal direction of the seat on which the armrest is used, is connected to a hinge or pivoting means comprising first and second pivot levers which are disposed at least in approximately parallel relationship with each other. The end portions of the first and second pivot levers, which are towards the armrest member, are connected together by means of a first element, with associated first and second connecting axis means connecting the first element to the first and second pivot levers. The armrest member is connected to the end portion of the second pivot lever, which is towards the armrest member. The first element and the armrest member are detachably fixed together by an arresting means. The armrest further includes a second element between the armrest member and the end portion of the second pivot lever which is towards the armrest member. The arresting means is thus operable for detachably fixing the first element to the second element. The end portion of the first pivot lever, which is towards the armrest member, has an arcuate first slot whose center of curvature is at the first connecting axis means. The arresting means includes an arresting member which extends through the arcuate first slot in the first pivot lever and also through the first and second elements. The end portion of the first pivot lever, which is towards the armrest member, has an arcuate retaining or detent sliding guide means having a radius of curvature which is larger than the radius of curvature of the first slot. The center of curvature of the retaining or detent sliding guide means is spaced from the first connecting axis means while a retaining or detent member is linearly movably mounted on the first element and is urged towards the retaining or detent sliding guide means, by a spring member.

In a preferred feature the first and second elements are in the form of flat elements, for example comprising a sheet or plate material such as metal plate.

In another preferred feature of the invention the arcuate retaining or detent sliding guide means can be provided along an edge portion of the first pivot lever and can be provided with retaining or detent notches or recesses which are disposed in mutually juxtaposed relationship.

In another preferred feature the spring member which urges the retaining or detent member towards the retaining or detent sliding guide means may be a tension coil spring.

In an armrest of that construction, in accordance with another preferred feature of the invention, the retaining or detent sliding guide means can be at a greater spacing from the first connecting axis means than the arcuate first slot, in which case the spring member can be operatively disposed between the first connecting axis means and the retaining or detent member.

To provide a limited, linearly movable arrangement of the retaining or detent member, the first element of the armrest arrangement according to the invention can further have a second slot in which the retaining or detent member is limitedly linearly movably arranged. That second slot can be of relatively short size, thereby to provide for adaptation to the configuration of the arcuate retaining or detent sliding guide means, that is to say the depth of the retaining or detent notches thereof.

So that the armrest according to the invention can be pivoted reciprocally as desired about the second connecting axis means between a position of use, in which therefore an arm can be rested thereon, and an inoperative position in which the armrest member is lifted up, the second element can have an arcuate third slot whose center of curvature is at the second connecting axis means, wherein the arresting member of the arresting means extends through the third slot.

It will be noted at this point that the armrest arrangement according to the invention has the above-mentioned second element which could be considered as part of the armrest member or as a portion of the armrest member, unlike the armrest arrangement of EP 0 010 867 B1 which has only a first element which can be detachably fixed to the armrest member by the arresting means.

The armrest according to the invention affords the advantage that it can be adjusted as desired in parallel relationship virtually continuously, that is to say in small steps, between a raised and forwardly disposed position and a lowered, rearwardly disposed position, and it can be arrested in the respectively selected position between those two limit positions, by virtue of operation of the arresting means. In this respect, the configuration of the detent or retaining sliding guide means, in relation to the first connecting axis means, affords the advantage that the torque which can act on the armrest member in relation to the pivoting means and which is at its greatest as a result of the long lever arm when the armrest member is in the rearwardly lowered position can be compensated for by means of the retaining or detent member or the action of the spring member which is suitably connected thereto. In other words, in the rearwardly lowered position of the armrest member, the spring member urges the retaining or detent member towards the retaining or detent sliding guide means, with a correspondingly greater spring force, or the spring force with which the retaining or detent member is urged against the retaining or detent sliding guide means is relatively low when the armrest member is in the raised position, being the situation in which the torque acting on the armrest member is correspondingly low.

The armrest according to the invention can also be designed to be adjustable as desired horizontally, in the respective pivotal position or its position in respect of height. Likewise the armrest can also be suitable for lateral pivotal movement in the respective set position in respect of height, in the corresponding horizontal plane. That is desirable in particular if the armrest according to the invention is combined with a joy-stick unit.

Further objects, features and advantages of the armrest assembly according to the invention will be apparent from the following description of a preferred embodiment thereof.

BRIEF DESCRIPTION OF THE DRAWING

The single FIGURE of the accompanying drawing is an exploded view of an embodiment of the armrest arrangement in accordance with the invention.

DESCRIPTION OF THE PREFERRED EMBODIMENT

Figure 1:
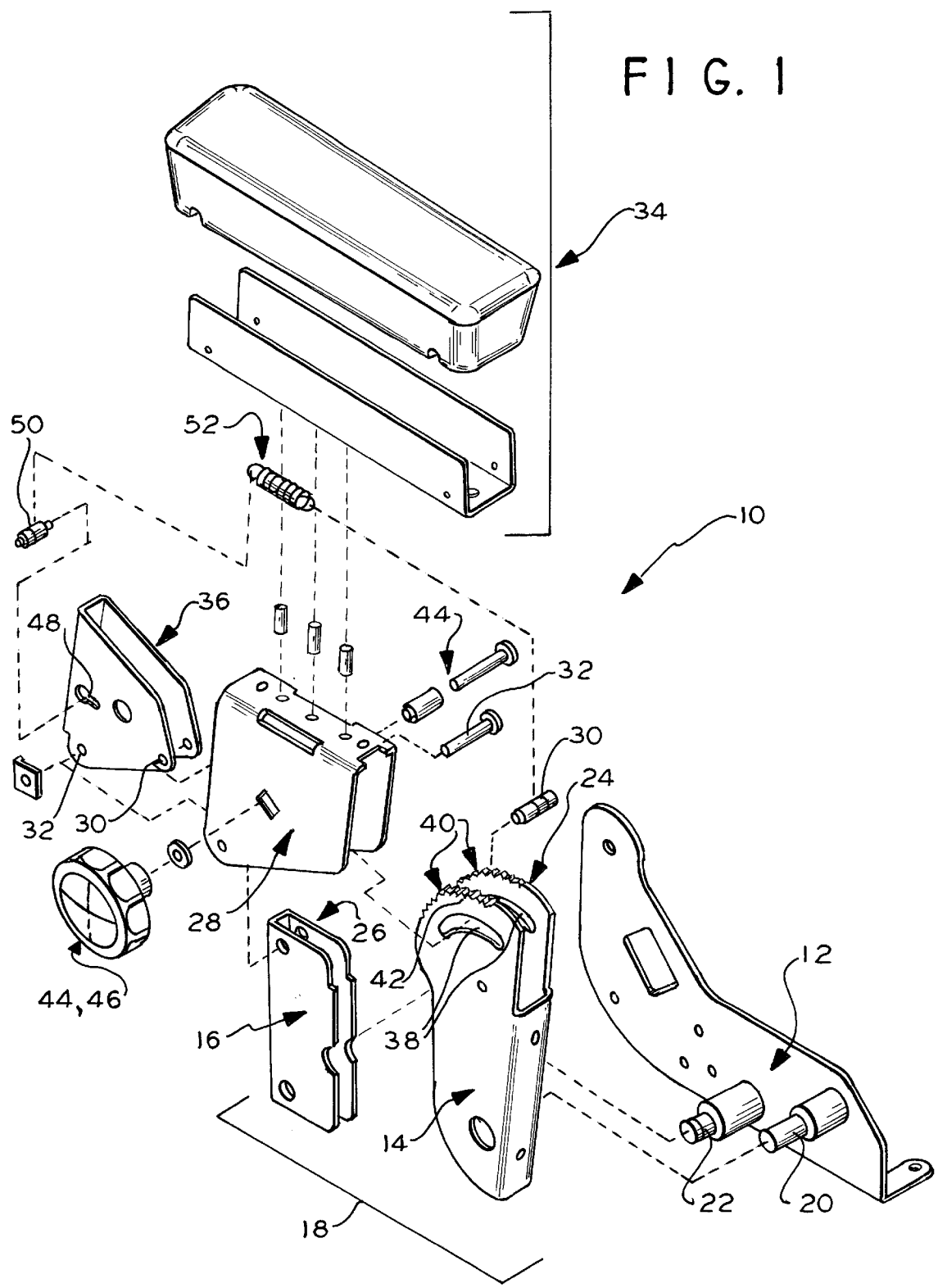

Referring therefore to the drawing, shown therein is an embodiment of the armrest according to the invention as indicated generally by reference numeral 10, comprising a base member 12 for fixing to a suitable support, from which a first pivot lever 14 and a second pivot lever 16 project upwardly. The first and second pivot levers 14 and 16 form a pivoting means which is indicated generally by reference numeral 18. The first pivot lever 14 is pivotably connected to the base member 12 by means of an axis member such as a shaft or spindle 20. The second pivot lever 16 is pivotably connected to the base member 12 by means of an associated axis member such as a shaft or spindle 22. Reference numeral 24 denotes an end portion of the first pivot lever 14, being an end portion which is towards an armrest member 34 of the armrest arrangement. Reference numeral 26 similarly denotes an end portion of the second pivot lever 16, which is also towards the armrest member 34. The first and second pivot levers 14 and 16 are pivotably connected together at their end portions 24 and 26 by means of a first element as indicated at 28, which thus forms a connecting element. This pivotal assembly is thus implemented by a first connecting axis means such as a shaft or spindle 30 between the end portion 24 of the first pivot lever 14 and the first element 28 and by a second connecting axis means such as a shaft or spindle 32 between the end portion 26 of the second pivot lever 16 and the first element 28.

As indicated above, reference numeral 34 denotes an armrest member which is pivotably connected by means of a second element as indicated at 36 and the second connecting axis means 32, to the end portion 26 of the second pivot lever 16, being the end portion that is towards the armrest member 34.

The end portion 24 of the first pivot lever 14 has an arcuate slot therein, as indicated at 38. The center of curvature of the arcuate slot 38 is disposed at the first connecting axis means 30. The end portion 24 of the first pivot lever 14 also has an arcuate retaining or detent sliding guide means as indicated at 40. The radius of curvature thereof is greater than the radius of curvature of the arcuate slot 38. This difference in the radii of curvature is clearly indicated by the arcuate dash-dotted line 42 which is concentric with respect to the first connecting axis means 30. The center of curvature of the arcuate retaining or detent sliding guide means 40 is disposed laterally beside the first connecting axis means 30. The purpose and aim of this configuration will be explained in greater detail hereinafter.

Reference numeral 44 denotes an arresting member of an arresting means 46. The arresting member 44 extends through the first element 28, through the second element 36 and through the arcuate slot 38 at the end portion 24 of the first pivot lever 14. The arresting member 44 is for example a screwthreaded pin or stud which is combined with an actuating head and which is screwed into a nut so that the first and second elements 28 and 36 can be fixedly and immovably connected to the end portion 24 of the first pivot lever 14 or so that those members can be released from each other so that thereafter the armrest member 34 can be pivoted as desired in parallel relationship in respect of height and in the longitudinal direction of the seat, with respect to the base member 12.

The second element 36 has a second slot 48 through which a retaining or detent member 50 extends. A spring member 52 is operatively disposed between the retaining member 50 and the first connecting axis means 30. The spring member 52 is in the form of a tension coil spring and is of such a size that at all times it urges the retaining member 50 against the retaining sliding guide means 40 and into a respective retaining or detent groove or notch therein.

In the illustrated condition of the armrest according to the invention, the armrest member 34 is shown as being in a raised, forwardly displaced position. In that condition, the spring member 52 is under a given degree of mechanical stress. When the armrest member 34 is moved rearwardly in the clockwise direction with respect to the base member 12 and in so doing at the same time pivots downwardly in parallel relationship, the retaining member 50 moves along the retaining sliding guide means 40 in relation thereto in the counter-clockwise direction. In that case, the spring member 52 is subjected to an increased mechanical stressing, as can be seen by reference to the arcuate line 42 which is concentric with respect to the first connecting axis means 30. That however signifies a corresponding increase in the spring force exerted by the spring member 52 and thus an increase in the retaining or detent force of the retaining action as between the retaining member 50 and the retaining sliding guide means 40 and thus also between the first element 28 and the first pivot lever 14, so that the armrest member 34 is prevented from unintentional downward and rearward movement.

So that, when the arresting means 46 is in a released or disengaged condition, the armrest member 34 can be pivoted from the horizontal position of use in which therefore an arm can be rested thereon, into a vertical inoperative position, about the second connecting axis means 32, the first element 28 which is connected to the armrest member 34 has an arcuate third slot as indicated at 54, the center of curvature of which is at the second connecting axis means 32. The arresting member 44 of the arresting means 46 also extends through the third slot 54.

It will be appreciated that the above-described arrangement in accordance with the invention has been set forth solely by way of example and illustration of the principles of the invention and that various modifications and alterations may be made therein without thereby departing from the spirit and scope of the invention.

What is claimed is:

1. In an armrest for a vehicle seat, comprising:

an armrest member adapted for adjustment in height and for simultaneous adjustment in a longitudinal direction of the seat, a pivoting means connected to the armrest member and including first and second pivot levers disposed in at least approximately parallel relationship with each other, the first and second pivot levers having end portions which are disposed proximal to the armrest member, a first element connecting together said end portions of the first and second pivot levers, associated first and second connecting axis means connecting said first element to said end portions of the first and second pivot levers, means connecting the armrest member to said end portion of the second pivot lever, and an arresting means detachably fixing the first element and the armrest member together, the improvement which includes, a second element operatively disposed between the armrest member and said end portion of the second pivot lever, wherein the arresting means is adapted to fix detachably the first element to the second element, an arcuate first slot in said end portion of the first pivot lever, the arcuate first slot having a center of curvature which is at the first connecting axis means, wherein the arresting means has an arresting member which extends through the arcuate first slot in the first pivot lever and through the first and second elements, an arcuate retaining sliding guide means at the end portion of the first pivot lever, said arcuate retaining sliding guide means having a radius of curvature which is larger than the radius of curvature of said first slot and the center of curvature of said retaining sliding guide means being spaced from the first connecting axis means, a retaining member linearly and movably mounted on the first element, and a spring member urging the retaining member toward the retaining sliding guide means.

2. An armrest as set forth in claim 1 wherein the retaining sliding guide means is at a greater spacing from the first connecting axis means than the arcuate first slot and wherein the spring member is operatively disposed between the first connecting axis means and the retaining member.

3. An armrest as set forth in claim 2 wherein said first element includes a second slot in which said retaining member is limitedly linearly movably arranged.

4. An armrest as set forth in claim 1 wherein said second element has an arcuate third slot having a center of curvature which is at said second connecting axis means and wherein said arresting member of said arresting means extends through said third slot.

5. An armrest arrangement for a vehicle seat, comprising:

a base member for mounting the armrest arrangement to a supporting structure, an armrest member, a pivoting means for adjustment of the armrest member in respect of height and for simultaneous adjustment in a longitudinal direction of the seat to which in use the arrangement is fitted, comprising first and second pivot levers disposed in at least approximately parallel relationship with each other and each having a first end portion and a second end portion, connecting means pivotably connecting the first end portions of the first and second pivot levers to the base member, a first element, first and second connecting axis means pivotably connecting the first element to respective ones of said second end portions of said first and second pivot levers, whereby said first element connects together said second end portions of said first and second pivot levers, means connecting the armrest member to said second end portion of said second pivot lever and including a second element operatively disposed between said armrest member and said second end portion of said second pivot lever, an arcuate first slot in said second end portion of said first pivot lever, said slot having a center of curvature at said first connecting axis means, an arresting means operatively disposed between said first element and said second element for detachably fixing said first and second elements together, the arresting means including an arresting member adapted to extend through said arcuate first slot in said first pivot lever and through said first and second elements, an arcuate retaining sliding guide means at said second end portion of said first pivot lever and having a radius of curvature which is larger than the radius of curvature of said first slot, the center of curvature of said retaining sliding guide means being spaced from first connecting axis means, a retaining member linearly movably mounted on said first element, and spring means adapted to urge said retaining member towards said retaining sliding guide means for retaining engagement therebetween.

\* \* \* \* \*